United States Patent [19]
Diethelm

[11] Patent Number: 5,998,053
[45] Date of Patent: Dec. 7, 1999

[54] METHOD FOR OPERATING AN APPARATUS WITH FUEL CELLS

[75] Inventor: Roland Diethelm, Bauma, Switzerland

[73] Assignee: Sulzer Hexis AG, Winterthur, Switzerland

[21] Appl. No.: 08/869,411

[22] Filed: Jun. 5, 1997

[30] Foreign Application Priority Data

Jun. 19, 1996 [EP] European Pat. Off. .............. 96810410
Dec. 2, 1996 [EP] European Pat. Off. .............. 96810840

[51] Int. Cl.$^6$ ................................................ H01M 8/04
[52] U.S. Cl. ................................. 429/14; 429/13; 429/20; 429/17; 429/25; 429/26
[58] Field of Search ................................. 429/13, 17, 25, 429/26, 14, 20

[56] References Cited

U.S. PATENT DOCUMENTS

| 3,146,131 | 8/1964 | Linden | 136/86 |
|---|---|---|---|
| 3,718,506 | 2/1973 | Fischer | 136/86 |
| 5,840,437 | 11/1998 | Diethelm | 429/17 |

FOREIGN PATENT DOCUMENTS

| 0 377 151 | 7/1990 | European Pat. Off. . |
|---|---|---|
| 0 654 838 A1 | 5/1995 | European Pat. Off. . |
| 0 668 622 A1 | 8/1995 | European Pat. Off. . |
| 42 17 892 A1 | 12/1992 | Germany . |
| WO 94/18712 | 8/1994 | WIPO . |

*Primary Examiner*—Bruce F. Bell
*Attorney, Agent, or Firm*—Townsend and Townsend and Crew LLP

[57] ABSTRACT

The apparatus comprises a cell block with fuel cells, a heat insulating jacket, an afterburner chamber between the jacket and the cell block, a preformer for a combustion gas as well as an auxiliary heat source. The method comprises a start-up phase and a current-delivering operating state. Hot combustion gases which are fed into the apparatus or are produced there in an auxiliary burner form the auxiliary heat source during the start-up phase. The apparatus comprises a first and a second heat exchanger, for the preheating of air and for preheating the preformer respectively. During the start-up phase air which is fed into the apparatus is preheated in the first heat exchanger by means of a mixture formed of hot combustion gas and exhaust air with the mixture being conducted separately from the air. Heat is supplied to the fuel cells with the preheated air. The exhaust air emerging from the cells is admixed to the hot combustion gas. In the second heat exchanger the preformer is heated to the operating temperature with the hot combustion gas.

13 Claims, 4 Drawing Sheets

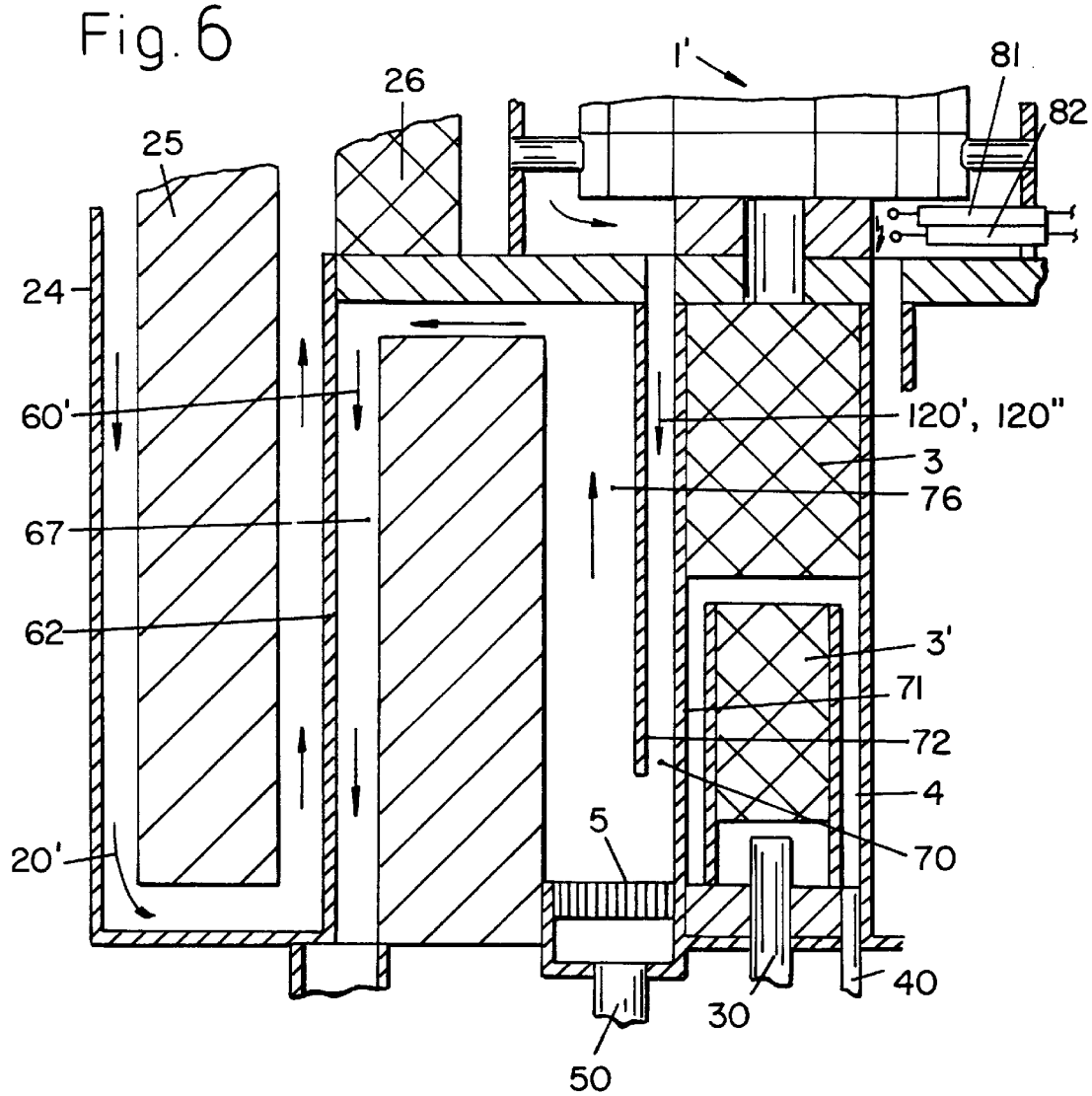

5,998,053

METHOD FOR OPERATING AN APPARATUS WITH FUEL CELLS

BACKGROUND OF THE INVENTION

1. Field of the Invention

The invention relates to a method for operating an apparatus with fuel cells wherein the method includes a start-up phase and a current-delivering operating state as well as to an apparatus with which the method can be carried out.

2. Description of the Prior Art

A prereformer is integrated into an apparatus of this kind which is known from EP-A 0654 838. During the start-up phase, an auxiliary burner is used to heat up the prereformer on the one hand and the infed air is preheated in a channel system in the jacket on the other hand. Heat is supplied to the cell block with the preheated air. This supply of heat is not sufficient to heat the fuel cells to a minimum operating temperature of 850° C. It is therefore necessary to feed combustion gas and air into the apparatus and allow it to burn in the afterburner chamber between the cell block and the jacket. Immediately after the beginning of the combustion, which must be ignited, large temperature gradients arise, through which the cells can be damaged.

SUMMARY OF THE INVENTION

The object of the invention is to provide a method for an apparatus with fuel cells as well as to provide a corresponding apparatus in which the cells remain undamaged during the start-up phase. The apparatus comprises a cell block with fuel cells, a heat insulating jacket, an afterburner chamber between the jacket and the cell block, a prereformer for a combustion gas as well as an auxiliary heat source. The method comprises a start-up phase and a current delivering operating state. Hot combustion gases which are fed into the apparatus or are produced there in an auxiliary burner form the auxiliary heat source during the start-up phase.

The apparatus in accordance with the invention contains a first and a second heat exchanger for the preheating of air and for the preheating of the prereformer respectively. The prereformer is arranged outside the cell block. It is advantageous to arrange the prereformer at the center of the second heat exchanger and the first heat exchanger concentrically about the second. With this arrangement, a ring gap in the second heat exchanger produces a connection between the afterburner chamber and the first heat exchanger.

In accordance with the invention, air which is supplied to the apparatus is preheated in the first heat exchanger during the start-up phase by means of a mixture of the hot combustion gas and exhaust air, the mixture being conducted separately from the air. Heat is supplied to the fuel cells with the preheated air. The exhaust air leaving the cells is admixed to the hot combustion gas. In the second heat exchanger, the prereformer is heated up to the operating temperature with the hot combustion gas. During the operating state, the exhaust gas leaving the afterburner chamber is used in the second heat exchanger as a heat source for the prereformer.

BRIEF DESCRIPTION OF THE DRAWINGS

FIG. 6 is a section as in FIG. 2 for a third exemplary embodiment.

DETAILED DESCRIPTION OF THE PREFERRED EXEMPLARY EMBODIMENTS

Figure 1:
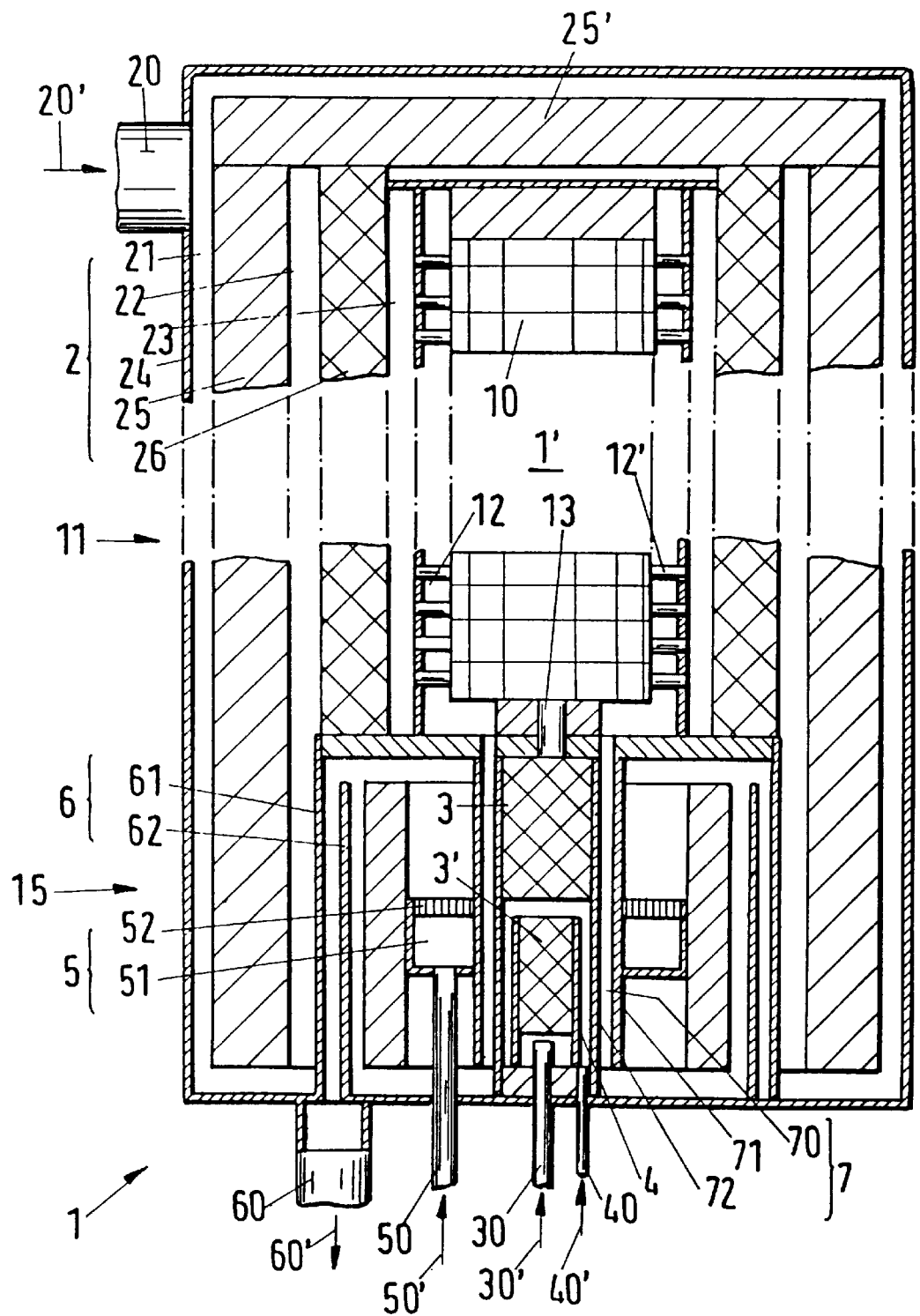
FIG. 1 is a vertical longitudinal section through the apparatus in accordance with the invention.

The apparatus 1 in FIG. 1 comprises a cell block 1' with fuel cells 10 in an upper part 11, a part of a heat insulating jacket 2, an afterburner chamber 12 and a supply point 20 for air 20'. The air 20' enters via a channel system 21, 22 and a wall 26 permeable to air into a ring-gap-shaped chamber 23, from which it is fed into the individual cells via tubelets 12'. Combustion gas can be supplied to the cell block 1' from a lower part 15 of the apparatus 1 via a central tube 13. The jacket 2, with an outer skin 24 and heat insulating walls 25, 25' and 26, is formed in such a manner that it acts as a preheater for the infed air 20'.

Figure 2:
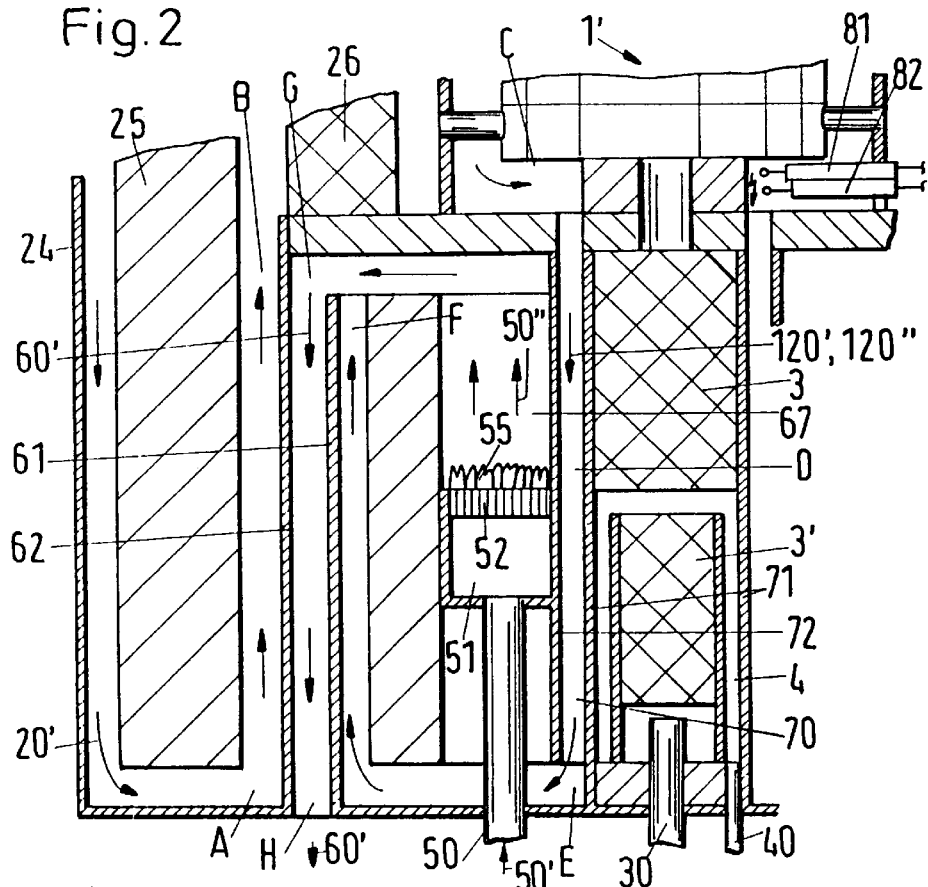
FIG. 2 is an enlarged section of the same apparatus.

The lower part 15 of the apparatus 1—see also FIG. 2—comprises, in addition to a part of the jacket 2, a prereformer 3, a sulphur absorber 3', an auxiliary burner 5, a first heat exchanger 6 and a second heat exchanger 7. Both the prereformer 3 and the sulphur absorber 3' have a cylindrical form. A jacket chamber 4 around the absorber 3' has the shape of a ring-gap and is executed as a vaporiser for water 40' (supply line 40). The auxiliary burner 5 is arranged in a ring space 67. It is executed as a toroidal chamber 51 which is closed off upwardly by a porous plate 52. A gas/air mixture 50' (supply line 50) is brought to combustion on this plate 52 with uniformly distributed passage openings, with an areally spread flame 55—see FIG. 2—forming.

The combustion gas 30' required for the current delivering reaction—generally natural gas is used—is conducted via the line 30 into the absorber 3', which is provided for the removal of impurities of the gas 50' which contain sulphur. Subsequently methane, which is contained in the gas 50', is converted in the prereformer 3 together with water into hydrogen and carbon monoxide. The energy required for this reaction is supplied during the current delivering operating state by the hot exhaust gas 120" (see FIG. 2) which comes out of the afterburner chamber 12 and flows through the second heat exchanger 7.

During the start-up phase the energy for heating the prereformer 3 is supplied by the auxiliary burner 5. The combustion gas 50" of the auxiliary burner 5 heats up the wall 72 of the second heat exchanger 7. The heat transport from the wall 72 to the inner wall 71, which is in heat-conducting contact with the prereformer 3, proceeds mainly through radiation, with the temperature difference between the two walls 71 and 72 amounting to about 100° C.

The combustion gas 50" of the auxiliary burner 5 flows radially outwards and is mixed with exhaust air 120' from the cell block 1' between the points F and G (see FIG. 2). The gas mixture 60' flows between the cylindrical walls 61 and 62 of the first heat exchanger 6 to an outlet point 60 where the partially cooled gas mixture 60' leaves the apparatus 1. The air supplied into the apparatus 1 flows along the wall 61 in counterflow to the gas mixture 60' and is thereupon heated from a temperature which lies only insubstantially above ambient temperature (i.e. about 20 to 30° C.) to a temperature between 700 to 800° C. Heat is supplied to the fuel cells 10 with the preheated air 20'. The exhaust air 120' leaving the cells 10 flows through the second heat exchanger 7 and is subsequently—as already mentioned—mixed with the combustion gases 50' of the auxiliary burner 5.

After the preformer and the cells have been warmed up to temperatures at which a current delivering operation can set in, the amounts of infed air 20' and combustion gas 30' are brought to values which correspond to a stationary operating state; the supply of the gas/air mixture 50' into the auxiliary burner 5 is discontinued. This happens when the cells have reached a temperature of about 800° C., i.e. when the temperature in the afterburner chamber 12 exceeds a value at which the spontaneous combustion of the gas leaving the cells—with air leaving simultaneously—commences. FIG. 2 shows the points A, B, . . . H in the channel system of the jacket 2. The indirect heat transfer from the hot gas mixture 60' to the infed air 20' takes place between the points A and B, and G and H respectively. Between C and D the exhaust air 120' or the hot exhaust gas 120" respectively, gives off heat to the preformer 3; between D and E it gives off heat to the water vaporizer 4 as well as to the sulphur absorber 3'. Between F and G the exhaust air 120' is mixed with the hot combustion gas 50" during the start-up phase.

Figure 3:
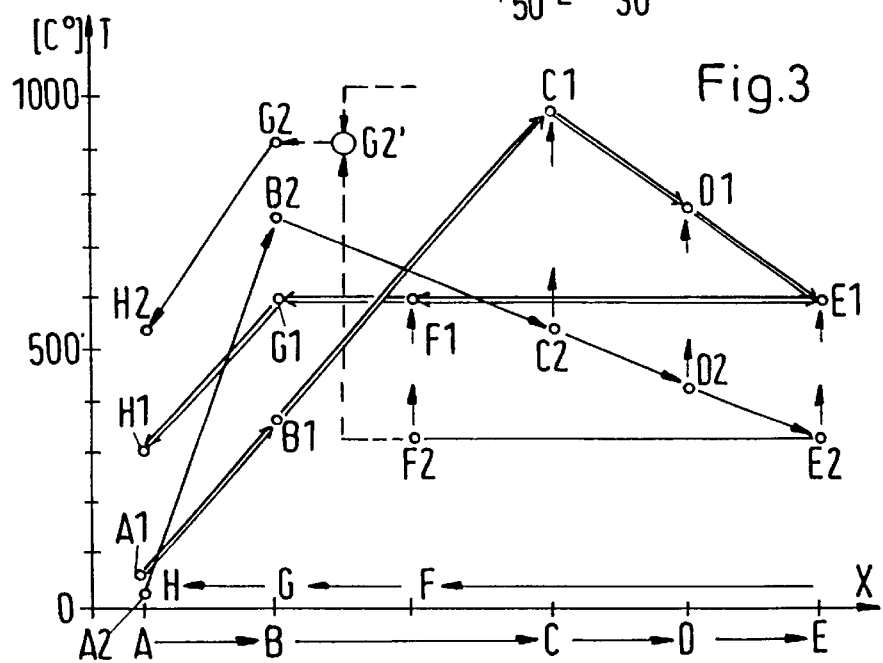
FIG. 3 is a diagram for explaining the method in accordance with the invention.

The diagram of FIG. 3 shows in a simplified manner the course of the temperatures in the channel system of the jacket 2, with the diagram points A1, B1 . . . showing the temperatures for the stationary operating state at the named points A, B, . . . , and the diagram points A2, B2 . . . correspondingly showing the temperatures passed through during the start-up phase. The points A, B, . . . are plotted on the x-axis, where the distances between these points, however, do not correspond to the actual distances in the apparatus 1. The upwardly directed arrows in the diagram show that the points C2, . . . F2 are displaced upwards in the course of the start-up phase so that they come to lie at the points C1, . . . F1. The point G2' corresponds to the mixture temperature that results on mixing the hot combustion gas 50" with the exhaust air 120'. The values (0–1000° C.) that can be read off on the T-axis for the diagram points A1, B1, . . . A2, B2, . . . correspond substantially to the actual temperatures. For the sake of simplicity the points C2 and D2 in the diagram are plotted on the linear connection between the points B2 and E2. The same holds for the point D1 on the connection between C1 and E1. During the start-up phase, it is advantageous to provide a slight gas supply into the cell block 1' in order that the gas spaces in the fuel cells 10 are flushed and in order that no air can enter into them. The flushing gas mixes with the exhaust air in the afterburner chamber 12 without a combustion taking place there prior to the ignition temperature being reached. A combustion can be ignited by means of ignition electrodes 81 and 82 beneath the cell block 1' so that the flushing gas is burned in the ring gap chamber 70 and the resulting heat can be taken up by the preformer 3 as well as by the absorber 3'.

The further development of the materials for fuel cells will presumably lead to the operation already being performable at temperatures between 600 and 700° C. in the future instead of between 850 and 900° C. The teaching disclosed here can, of course, also be applied in corresponding apparatuses with lower operating temperatures.

The auxiliary heat source required for the start-up phase need not be produced by the auxiliary burner 5. It is also possible to form the auxiliary heat source with hot combustion gases from an external burner 9—see FIG. 4.

Figure 4:
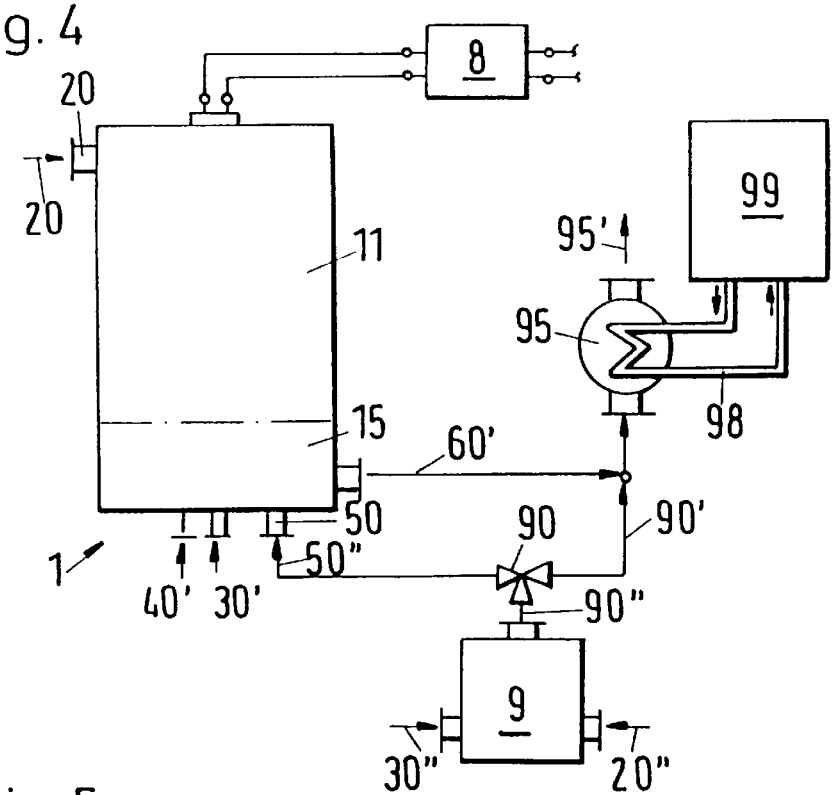
FIG. 4 is a schematic representation of a plant in which a heating system forms a combination with the apparatus of the invention.

The apparatus shown schematically in FIG. 4 shows, in addition to the apparatus 1 in accordance with the invention and the burner 9, a heat exchanger 95 as well as a heat consumer 99, for example, a room heating system. Gas 30" is burned with air 20" in the burner 9 to form the combustion gas 90".

Using the member 90, the combustion gas 90" can be selectively supplied to the heat exchanger 95 (gas flow 90') or to the apparatus 1 (gas flow 50") through the connecting stub 50. The hot combustion gas 50" can be fed into the lower part 15 of the apparatus 1 in a manner similar to the gas/air mixture 50' via a torus-shaped distributor body (corresponding to the auxiliary burner 5 in FIG. 1).

In addition, the heat exchanger 95 can also be used for utilizing the exhaust heat set free from the apparatus 1 with the hot exhaust gas 60'. The heat won in the heat exchanger 95 is supplied to the consumer 99 via the line 98. The gas flow 95' with the cooled gases is conducted into a non-illustrated chimney.

FIG. 4 shows, in addition, that the electrical direct current produced in the upper part 11 of the apparatus 1 from the gas 30', the water 40' and the air 20' is converted into an alternating current in a converter 8.

Figure 5:
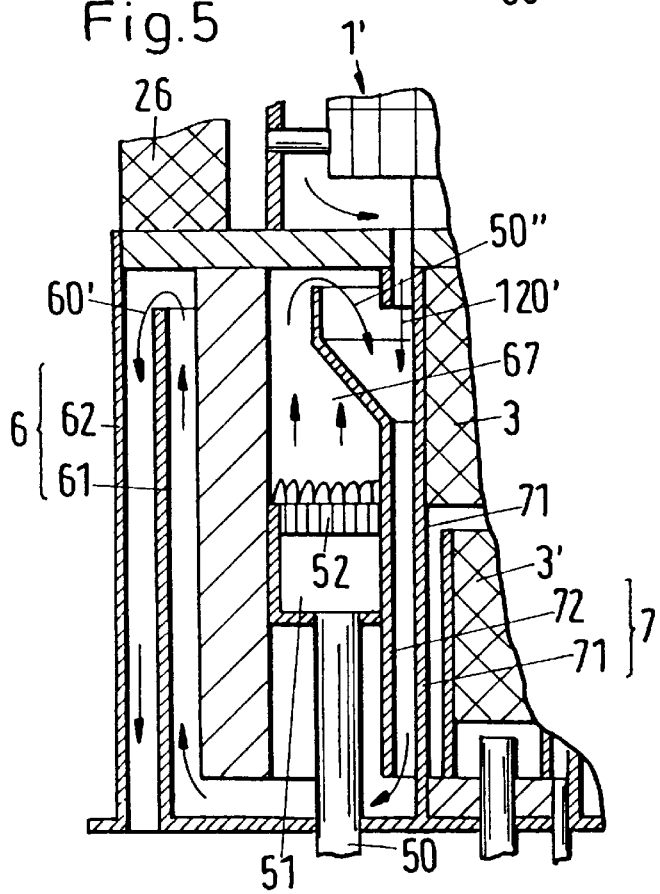
FIG. 5 is a detail of the second exemplary embodiment of the apparatus in accordance with the invention.

FIG. 5 shows a detail of an exemplary embodiment in which the conduction of the hot combustion gas 50", and accordingly the second heat exchanger 7, have been modified. Instead of radially outwards, the gas 50" first flows towards the center and into the heat exchanger 7, where it is mixed with the exhaust air 120'. In this embodiment, the heat exchange takes place from the hot gas 50" into the preformer 3 via only one wall, namely the wall 71.

In the third exemplary embodiment of FIG. 6 a channel system comprising three concentric ring gap spaces 70, 76 and 67 adjoins and follows the afterburner chamber 12. The auxiliary burner 5 is arranged at the transition from the inner ring gap space 70 to the middle ring gap space 76 and it borders on the outer surface of the apparatus 1, i.e. is disposed adjacent the outer surface of the apparatus. The outer ring gap space 67 belongs to the first heat exchanger 6, whereas the other two form parts of the second heat exchanger 7. In comparison with the first two exemplary embodiments, the third one represents a simpler construction, since the first heat exchanger 6 comprises only one ring gap space 67 on the exhaust gas side and thus the wall 61 is omitted. The arrangement of the auxiliary burner 5 at the outer surface of the apparatus 1 is particularly advantageous since the gas mixture supplied via the line 50 is less strongly heated by the hot exhaust gas 120', 120" and thus the danger of a spontaneous combustion in the space 51 is less great.

What is claimed is:

1. A method for operating an apparatus with fuel cells wherein the apparatus comprises a cell block, a heat insulating jacket, an afterburner chamber between the jacket and the cell block, a preformer for a combustion gas and an auxiliary heat source, the method including a start-up phase and a current-delivering operating state, the method comprising:

providing hot combustion gases at the apparatus to thereby form the auxiliary heat source during the start-up phase;

admixing exhaust air that emerges from the cells to the hot combustion gas;

supplying air to the apparatus during the start-up phase that is preheated in a first heat exchanger by means of a mixture of the hot combustion gas and exhaust air, the mixture being conducted separately from the air;

supplying heat to the fuel cells with the preheated air;

heating the preformer to an operating temperature with the hot combustion gas in a second heat exchanger; and using exhaust gas that leaves the afterburner chamber during the operating state in the second heat exchanger as a source of heat for the prereformer.

2. A method in accordance with claim 1 wherein during the start-up phase, the heat transfer from the hot combustion gas to the prereformer that takes place in the second heat exchanger takes place via a ring gap through which the exhaust air flowing out of the cell block and through the afterburner chamber is conducted into the first heat exchanger.

3. A method in accordance with claim 1 wherein after the prereformer and the cells have been heated to temperatures at which a current-delivering operation may set in, the amounts of infed air and gas are brought to values that correspond to a stationary operating state, and wherein the heat supply of the auxiliary heat source is discontinued.

4. A method in accordance with claim 1 wherein the heat supply of the auxiliary heat source is discontinued when the cells have attained a temperature of approximately 800° C.

5. A method in accordance with claim 1 wherein the amounts of infed air and gas are brought to values that correspond to a stationary operating state at a time when the temperature in the afterburner chamber exceeds a value at which the spontaneous combustion of the air/gas mixture sets in.

6. A method in accordance with claim 1 wherein at the beginning of the start-up phase, infed air is preheated from approximately 20° C. to 30° C. to approximately 700° C. to 800° C. in the first heat exchanger, with the indirect heat exchange between the mixture of hot combustion gas and exhaust air being performed in counterflow.

7. A method in accordance with claim 1 wherein the prereformer is arranged outside the cell block and in the center of the second heat exchanger, and wherein during the current-delivering operating state, the method further comprises supplying the prereformer with heat through a flow directed radially inwards with the exhaust gases flowing out of the afterburner chamber into the second heat exchanger.

8. A method in accordance with claim 7 wherein the first heat exchanger is arranged concentrically about the second heat exchanger, and wherein the hot combustion gas that is provided is provided via a ring space between the two heat exchangers.

9. An apparatus with fuel cells, the apparatus comprising:

a cell block;

a heat insulating jacket;

an afterburner chamber between the jacket and the cell block;

a prereformer for combustion gas;

an auxiliary burner for producing an auxiliary heat source for a start-up phase;

first and second heat exchangers for the preheating of air and for preheating the prereformer, respectively; and a ring gap arranged in the second heat exchanger for producing a connection between the afterburner chamber and the first heat exchanger;

wherein the prereformer is arranged outside the cell block at the center of the second heat exchanger; and wherein the first heat exchanger is arranged concentrically about the second heat exchanger.

10. An apparatus in accordance with claim 9 wherein the internal auxiliary burner comprises a ring-shaped combustion surface and is arranged between the first and second heat exchangers.

11. An apparatus in accordance with claim 10 wherein a channel system comprising three concentric ring gap spaces adjoins and follows the afterburner chamber, wherein the auxiliary burner is arranged at the transition from the inner ring gap space to the middle ring gap spaces, and wherein the auxiliary burner borders on an outer surface of the apparatus.

12. An apparatus in accordance with claim 9 wherein the auxiliary burner is an external auxiliary burner and a ring-shaped chamber is arranged between the first and the second heat exchangers into which hot combustion gases may be fed that are produced with the external auxiliary burner.

13. An apparatus in accordance with claim 9 wherein the cell block is built up of a cylindrical stack of fuel cells, and wherein the afterburner chamber surrounds the stack in the form of a ring gap.

* * * * *